(12) United States Patent
Edme et al.

(10) Patent No.: US 10,620,330 B2
(45) Date of Patent: Apr. 14, 2020

(54) ESTIMATING TRANSLATIONAL DATA

(71) Applicant: WESTERNGECO L.L.C., Houston, TX (US)

(72) Inventors: Pascal Edme, Cambridge (GB); Everhard Johan Muijzert, Girton (GB)

(73) Assignee: WesternGeco L.L.C., Houston, TX (US)

( * ) Notice: Subject to any disclaimer, the term of this patent is extended or adjusted under 35 U.S.C. 154(b) by 785 days.

(21) Appl. No.: 13/847,378

(22) Filed: Mar. 19, 2013

(65) Prior Publication Data

US 2014/0288837 A1    Sep. 25, 2014

(51) Int. Cl.
*G01V 1/28*    (2006.01)

(52) U.S. Cl.
CPC ............ *G01V 1/28* (2013.01); *G01V 2210/57* (2013.01)

(58) Field of Classification Search
CPC . G01V 1/42; G01V 1/364; G01V 1/36; G01V 3/15; G01V 1/362; G01V 1/20; G01V 1/38; G01V 1/284; G01V 1/3808; G01V 1/52; E21B 47/091
USPC .......... 324/244; 367/25, 43, 40, 24, 178, 15, 367/56, 20; 702/6, 14
See application file for complete search history.

(56) References Cited

U.S. PATENT DOCUMENTS

| | | | |
|---|---|---|---|
| 5,618,937 A | 4/1997 | Askin et al. | |
| 5,648,937 A | 7/1997 | Campbell | |
| 6,841,994 B1 * | 1/2005 | Wiegert | G01V 3/15 324/244 |
| 8,712,694 B2 * | 4/2014 | Edme | G01V 1/366 702/17 |
| 2005/0283315 A1 * | 12/2005 | Haugland | E21B 47/091 702/6 |
| 2006/0245300 A1 * | 11/2006 | De Kok | G01V 1/38 367/15 |
| 2007/0056795 A1 * | 3/2007 | Cox | G01V 1/52 181/111 |
| 2007/0076025 A1 * | 4/2007 | Nagashima | B41J 2/165 347/7 |
| 2008/0316860 A1 * | 12/2008 | Muyzert | G01V 1/42 367/25 |
| 2009/0040872 A1 * | 2/2009 | Pabon | G01V 1/36 367/24 |

(Continued)

FOREIGN PATENT DOCUMENTS

GB    2456313    7/2009

OTHER PUBLICATIONS

O. Robertsson and A. Curtis, "Wavefield separation using densely deployed three-component single-sensor groups in land surface-seismic recordings," Geophysics Vo. 67, Sep.-Oct. 2002, No. 5, 1624-1633.

(Continued)

*Primary Examiner* — Regis J Betsch
*Assistant Examiner* — Kaleria Knox
(74) *Attorney, Agent, or Firm* — Fletcher Yoder, P.C.

(57) ABSTRACT

Translational data acquired by at least one seismic sensor is received. Gradient sensor data acquired by at least one gradient sensor is received. Estimated translational data at a position away from at least one position of the at least one seismic sensor is computed, where the computing is based on the gradient sensor data and the translational data.

17 Claims, 6 Drawing Sheets

(56) References Cited

U.S. PATENT DOCUMENTS

| | | | |
|---|---|---|---|
| 2009/0122641 A1* | 5/2009 | Hillesund | G01V 1/3808 367/20 |
| 2009/0213693 A1 | 8/2009 | Du et al. | |
| 2010/0195439 A1* | 8/2010 | Muyzert | G01V 1/20 367/56 |
| 2010/0211322 A1* | 8/2010 | Vassallo | G01V 1/364 702/14 |
| 2010/0302909 A1* | 12/2010 | Muyzert | G01V 1/184 367/178 |
| 2010/0329078 A1* | 12/2010 | Christie | G01V 1/364 367/40 |
| 2011/0080808 A1* | 4/2011 | Muyzert | G01V 1/20 367/43 |
| 2012/0053841 A1 | 3/2012 | Li et al. | |
| 2012/0113749 A1 | 5/2012 | Edme et al. | |
| 2012/0253683 A1 | 10/2012 | Edme et al. | |
| 2013/0088939 A1 | 4/2013 | Edme et al. | |
| 2013/0128696 A1* | 5/2013 | Vassallo | G01V 1/362 367/43 |

OTHER PUBLICATIONS

International search report and written opinion for the equivalent PCT patent application No. PCT/US2014/030951 dated Jul. 14, 2014.

Office Action for the equivalent GCC patent application for GC2014-26858 dated Oct. 16, 017.

International Preliminary Report on Patentability for the equivalent PCT patent application No. PCT/US2014/030951 dated Sep. 22, 2015 (9 pages).

* cited by examiner

ESTIMATING TRANSLATIONAL DATA

BACKGROUND

Seismic surveying is used for identifying subterranean elements, such as hydrocarbon reservoirs, freshwater aquifers, gas injection zones, and so forth. In seismic surveying, seismic sources are placed at various locations on a land surface or seafloor, with the seismic sources activated to generate seismic waves directed into a subterranean structure.

The seismic waves generated by a seismic source travel into the subterranean structure, with a portion of the seismic waves reflected back to the surface for receipt by seismic sensors (e.g., geophones, accelerometers, etc.). These seismic sensors produce signals that represent detected seismic waves. Signals from the seismic sensors are processed to yield information about the content and characteristic of the subterranean structure.

A land-based seismic survey arrangement can include deploying an array of seismic sensors on the ground. Marine surveying involves deploying seismic sensors on a streamer or seabed cable.

SUMMARY

In general, according to some embodiments, translational data acquired by at least one seismic sensor is received. Gradient sensor data acquired by at least one gradient sensor is received. Estimated translational data at a position away from at least one position of the at least one seismic sensor is computed, where the computing is based on the gradient sensor data and the translational data.

Other features will become apparent from the following description, from the drawings, and from the claims.

BRIEF DESCRIPTION OF THE DRAWINGS

Some embodiments are described with respect to the following figures.

DETAILED DESCRIPTION

Figure 1:
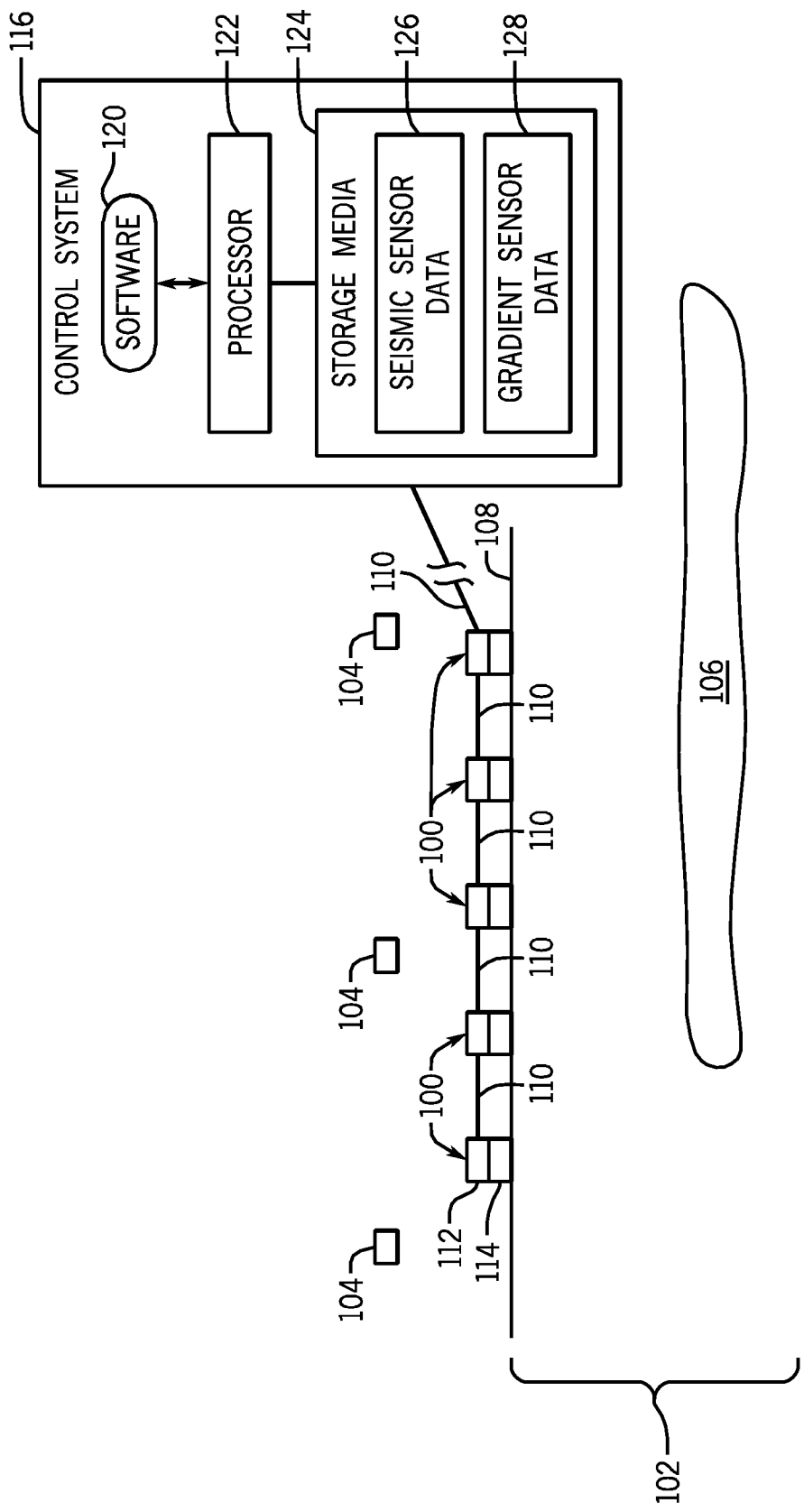
FIG. 1 is a schematic diagram of an example arrangement of sensor assemblies that can be deployed to perform seismic surveying, according to some embodiments.

In seismic surveying (marine or land-based seismic surveying) of a subterranean structure, seismic sensors are used to measure seismic data, such as displacement, velocity or acceleration data. Seismic sensors can include geophones, accelerometers, MEMS (microelectromechanical systems) sensors, or other types of sensors that measure the translational motion (e.g., displacement, velocity and/or acceleration) of the surface at least in the vertical direction and possibly in one or both horizontal directions. Such sensors are referred to as translational survey sensors, since they measure translational (or vectorial) motion.

Each seismic sensor can be a single-component (1C), two-component (2C), or three-component (3C) sensor. A 1C sensor has a sensing element to sense a wavefield along a single direction; a 2C sensor has two sensing elements to sense wavefields along two directions (which can be generally orthogonal to each other, to within design, manufacturing, and/or placement tolerances); and a 3C sensor has three sensing elements to sense wavefields along three directions (which can be generally orthogonal to each other).

A seismic sensor at the earth's surface can record the vectorial part of an elastic wavefield just below the free surface (land surface or seafloor, for example). When multicomponent sensors are deployed, the vector wavefields can be measured in multiple directions, such as three orthogonal directions (vertical Z, horizontal inline X, horizontal crossline Y). Measurement data in the X or Y direction acquired by a seismic sensor refers to horizontal translational data, while measurement data in the Z direction acquired by a seismic sensor refers to vertical translational data.

Seismic sensors can be provided in an array, such as a one-dimensional (1D) array or two-dimensional (2D) array. A 2D array of seismic sensors can have seismic sensors along a first direction and along a second direction that is generally orthogonal to the first direction. The first direction can be the X (horizontal inline) direction, while the second direction can be the Y (horizontal crossline) direction. A 1D array of seismic sensors can be arranged in either the X direction or Y direction. In other examples, other arrays or patterns of seismic sensors can be provided.

Various types of wavefields can be detected by seismic sensors. Such wavefields include wavefields reflected from a subterranean element in response to at least one wavefield propagated by at least one seismic source. Additionally, there can be noise-related wavefields, such as ground-roll noise or other noise wavefields. The different types of wavefields that are detectable by the seismic sensors may have different frequencies and velocities (and thus different wavelengths). A higher frequency wavefield has a shorter wavelength.

In some cases, measurement data can be collected by a relatively dense array of seismic sensors. To avoid aliasing, the spacing between two successive seismic sensors in either the X or Y direction should be less than or equal to half the distance that is equal to the shortest wavelength of interest.

Deploying a relatively dense pattern of seismic sensors can be expensive in terms of equipment cost and labor. Also, deploying a larger number of seismic sensors means that a larger amount of time is involved in performing the deployment. In accordance with some embodiments, to allow for deployment of sparser arrangements of seismic sensors, while still achieving relatively accurate results, gradient sensors can be deployed to measure gradient sensor data. Output from the gradient sensors can be used to assist in interpolating translational data at points between seismic sensors, such that translational data can be provided at geometric points where seismic sensors do not exist. The ability to interpolate translational data at any geometric point allows for denser sampling of measurement data, even though a sparser arrangement of seismic sensors is deployed. In some embodiments, the interpolated translational data can include horizontal translational data.

As discussed further below, in other implementations, extrapolation of horizontal translational data can be performed, where extrapolation refers to projecting data from a first position (where a seismic sensor is located) to a second position (where a seismic sensor is not located). Extrapolation of horizontal translational data can also use an output of a gradient sensor, similar to the interpolation discussed above.

More generally, techniques or mechanisms according to some implementations are able to estimate horizontal translational data at a location where no seismic sensor is located.

A gradient sensor can refer to a sensor that measures one or more spatial derivatives of a seismic wavefield, such as a sensor that measures curl and divergence of the wavefield. A sensor that measures the curl of a wavefield can be a rotational sensor, while a sensor that measures divergence of the wavefield can be a divergence sensor. Thus gradient sensor data can refer to either or both of rotation data (such as from a rotational sensor) and divergence data (from a divergence sensor or a mini-array of sensors).

Rotation data refers to the rotational component of the seismic wavefield. As an example, one type of rotational sensor to measure rotation data is the R-1 rotational sensor from Eentec, located in St. Louis, Mo. In other examples, other rotational sensors can be used.

Rotation data refers to a rate of a rotation (or change in rotation over time) about an axis, such as about the horizontal inline axis (X) and/or about the horizontal crossline axis (Y) and/or about the vertical axis (Z). In a land-based seismic surveying context, the inline axis X can be selected to be any horizontal direction, while the crossline axis Y can be any axis that is generally orthogonal to X.

In some examples, a rotational sensor can be a multi-component rotational sensor that is able to provide measurements of rotation rates around multiple orthogonal axes (e.g., $R_X$ about the inline axis X, $R_Y$ about the crossline axis Y, and $R_Z$ about the vertical axis Z). Generally, $R_i$ represents rotation data, where the subscript i represents the axis (X, Y, or Z) about which the rotation data is measured.

In other implementations, instead of using a rotational sensor to measure rotation data, the rotation data can be derived from measurements (referred to as "vectorial data" or "translational data") of at least two closely-spaced apart seismic sensors used for measuring a seismic wavefield component along a particular direction, such as the inline or crossline direction (X or Y). Rotation data can be derived from the vectorial data of closely-spaced seismic sensors that are within some predefined distance of each other.

In some examples, the rotation data can be obtained in two orthogonal components. A first component is in the direction towards the seismic source (rotation around the crossline axis, Y, in the inline-vertical plane, X-Z plane), and the second component is perpendicular to the first component (rotation around the inline axis, X, in the crossline-vertical plane, Y-Z plane).

In some implementations, a divergence sensor used to measure divergence data is formed using a container filled with a material in which a pressure sensor (e.g., a hydrophone) is provided. The material in which the pressure sensor is immersed can be a liquid, a gel, or a solid such as sand or plastic. The pressure sensor in such an arrangement is able to record a seismic divergence response of a subsurface, where this seismic divergence constitutes the horizontal signal component.

In other implementations, instead of using a divergence sensor to measure divergence data, the divergence data can be derived from measurements (referred to as "vectorial data" or "translational data") of at least four closely-spaced apart seismic sensors used for measuring a seismic wavefield component along a particular direction, such as the inline or crossline direction (X or Y). Divergence data can be derived from the vectorial data of closely-spaced seismic sensors that are within some predefined distance of each other.

FIG. 1 is a schematic diagram of a side view of an arrangement of sensor assemblies (or sensor stations) 100 that are used for land-based seismic surveying. Note that techniques or mechanisms can also be applied in marine surveying arrangements. The sensor assemblies 100 are deployed on a ground surface 108 (in an array or other pattern). A sensor assembly 100 being "on" a ground surface means that the sensor assembly 100 is either provided on and over the ground surface, or buried (fully or partially) underneath the ground surface such that the sensor assembly 100 is with 10 meters of the ground surface. The ground surface 108 is above a subterranean structure 102 that contains at least one subterranean element 106 of interest (e.g., hydrocarbon reservoir, freshwater aquifer, gas injection zone, etc.). One or more seismic sources 104, which can be vibrators, air guns, explosive devices, and so forth, are deployed in a survey field in which the sensor assemblies 100 are located. The one or more seismic sources 104 are also provided on the ground surface 108.

Activation of the seismic sources 104 causes seismic waves to be propagated into the subterranean structure 102. In another example, instead of using controlled seismic sources as noted above to provide controlled source or active surveys, techniques according to some implementations can be used in the context of passive surveys. Passive surveys use the sensor assemblies 100 to perform one or more of the following: (micro)earthquake monitoring; hydro-frac monitoring where microearthquakes are observed due to rock failure caused by fluids that are actively injected into the subsurface (such as to perform subterranean fracturing); and so forth.

Seismic waves reflected from the subterranean structure 102 (and from the subterranean element 106 of interest) are propagated upwardly towards the sensor assemblies 100. Seismic sensors 112 (e.g., geophones, accelerometers, MEMS sensors, etc.) in the corresponding sensor assemblies 100 measure the seismic waves reflected from the subterranean structure 102. Moreover, in accordance with various embodiments, the sensor assemblies 100 further include gradient sensors 114 that are designed to measure gradient sensor data (e.g., rotation data and divergence data).

Although a sensor assembly or sensor station 100 is depicted as including both a seismic sensor 112 and a gradient sensor 114, note that in other implementations, the seismic sensors 112 and gradient sensors 114 can be included in separate sensor assemblies. In either case, however, a seismic sensor and a corresponding associated gradient sensor are considered to be collocated—multiple sensors are "collocated" if they are each located generally in the same location, or they are located near each other to within some predefined distance, e.g., less than 5 meters, of each other.

In some implementations, the sensor assemblies 100 are interconnected by an electrical cable 110 to a control system 116. In another example, instead of connecting the sensor assemblies 100 by the electrical cable 110, the sensor assemblies 100 can communicate wirelessly with the control system 116. In some examples, intermediate routers or concentrators may be provided at intermediate points of the network of sensor assemblies 100 to enable communication between the sensor assemblies 100 and the control system 116.

The control system 116 shown in FIG. 1 further includes processing software 120 that is executable on one or more processors 122. The processor(s) 122 is (are) connected to storage media 124 (e.g., one or more disk-based storage devices and/or one or more memory devices). In the example of FIG. 1, the storage media 124 is used to store seismic data 126 communicated from the seismic sensors 112 of the sensor assemblies 100 to the control system 116, and to store gradient sensor data 128 communicated from the strain sensors 114.

In operation, the processing software 120 is used to process the seismic data 126 and the gradient sensor data 128. The seismic data 126 can be combined with the gradient sensor data 128 to perform interpolation of seismic data. More details regarding interpolation techniques are provided further below.

Figure 2:
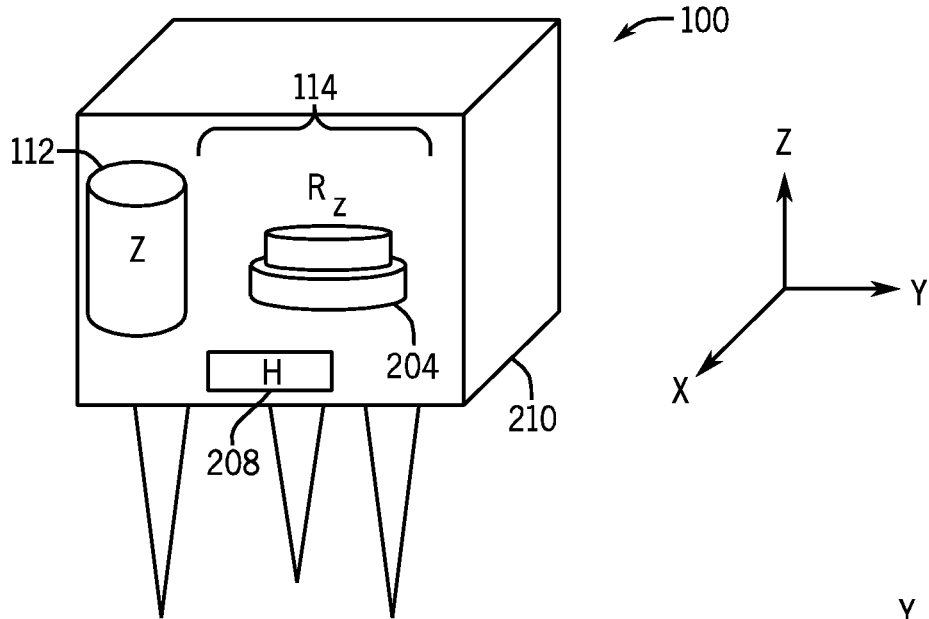
FIGS. 2 and 3 are schematic diagrams of sensor assemblies according to various embodiments.
Figure 2A:
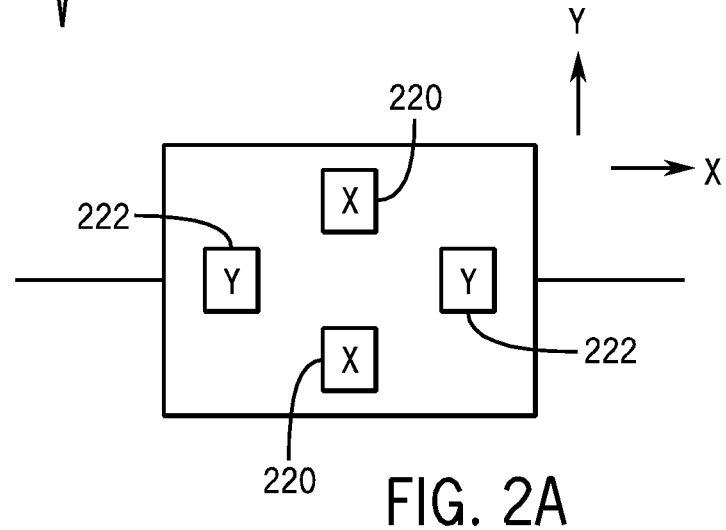
FIGS. 2A and 2B illustrate closely-spaced seismic sensors useable to derive rotational data or divergence data, respectively.

FIG. 2 illustrates an example sensor assembly (or sensor station) 100, according to some examples. The sensor assembly 100 can include a seismic sensor 112, which can be a particle motion sensor (e.g., geophone or accelerometer) to sense particle velocity along a particular axis, such as the Z axis. In addition, the sensor assembly 100 includes a rotational sensor 204 that is oriented to measure a rate of rotation ($R_Z$) about the vertical axis (Z axis). In other examples, the sensor assembly 100 can also include rotational sensor(s) to measure a rate of rotation, such as a rate of rotation ($R_X$) about the inline axis (X axis), and/or an rate of rotation ($R_Y$) about the crossline axis (Y axis). In further different examples where rotation data is derived from seismic data measured by closely-spaced apart seismic sensors, as discussed above, the sensor 204 can be omitted. The sensor assembly 100 has a housing 210 that contains the sensors 112 and 204. To derive rotation data $R_Z$ from the closely-spaced apart seismic sensors, an arrangement as shown in FIG. 2A can be provided, where seismic sensors 220 containing "X" represent seismic sensors for measuring seismic data in the X direction, and seismic sensors 222 containing "Y" represent seismic sensors for measuring seismic data in the Y direction.

Figure 2B:
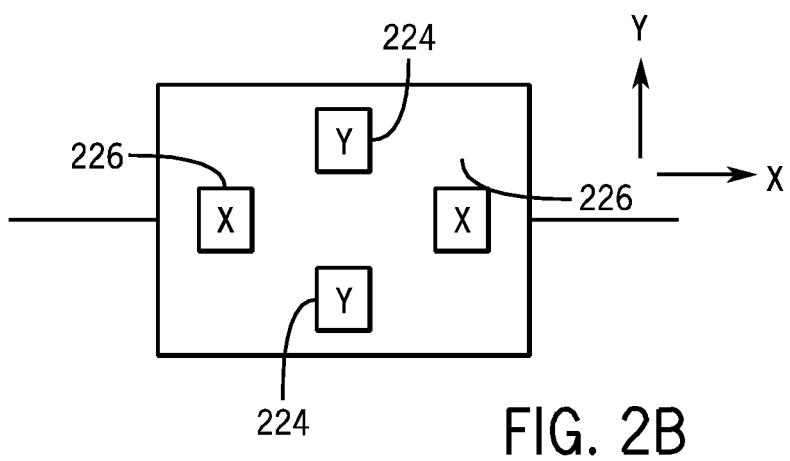

The sensor assembly 100 of FIG. 2 can further include a divergence sensor 208, which can be included in some implementations of the sensor assembly 100. As yet another example, the sensor assembly 100 can include the divergence sensor 208 instead of the rotational sensor 204. In further examples, the divergence sensor 208 can be omitted, and instead, divergence data $U_D$ can be derived from measurements of at least four closely-spaced apart seismic sensors used for measuring a seismic wavefield component along a particular direction, such as the inline or crossline direction (X or Y). One example of such arrangement is depicted in FIG. 2B, where seismic sensors 224 measure seismic data in the Y direction, and seismic sensors 226 measure seismic data in the X direction.

Figure 3:
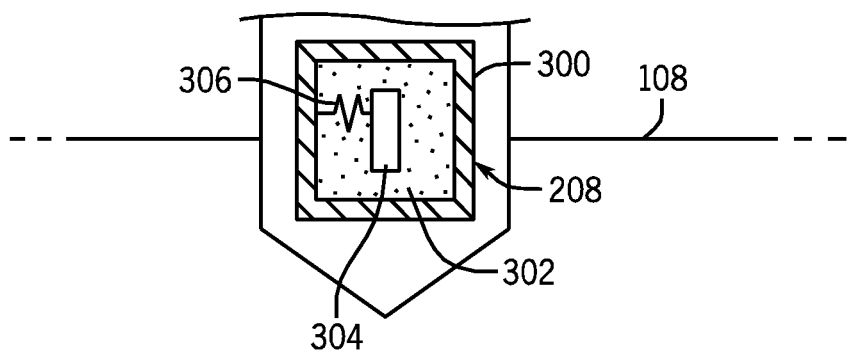

An example of a divergence sensor 208 is shown in FIG. 3. The divergence sensor 208 has a closed container 300 that is sealed. The container 300 contains a volume of liquid 302 (or other material such as a gel or a solid such as sand or plastic) inside the container 300. Moreover, the container 300 contains a hydrophone 304 (or other type of pressure sensor) that is immersed in the liquid 302 (or other material). The hydrophone 304 is mechanically decoupled from the walls of the container 300. As a result, the hydrophone 304 is sensitive to just acoustic waves that are induced into the liquid 302 through the walls of the container 300. To maintain a fixed position, the hydrophone 304 is attached by a coupling mechanism 306 that dampens propagation of acoustic waves through the coupling mechanism 306. Examples of the liquid 302 include the following: kerosene, mineral oil, vegetable oil, silicone oil, and water. In other examples, other types of liquids or another material can be used.

Figure 4:
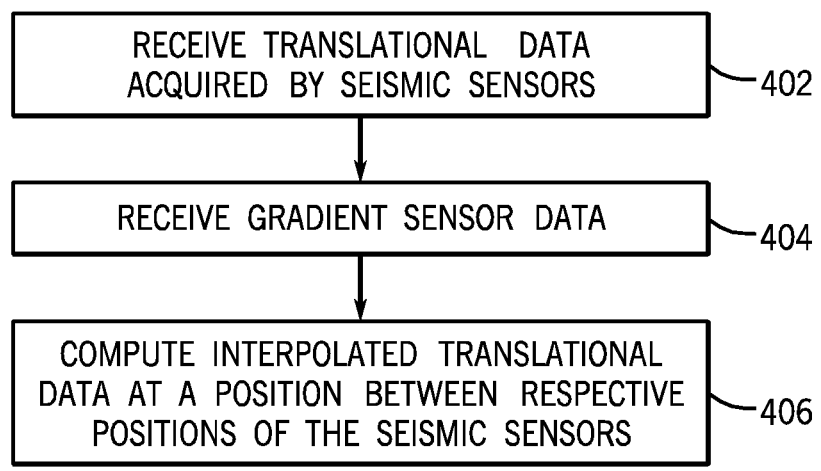
FIG. 4 is a flow diagram of an interpolation process according to some implementations.

FIG. 4 is a flow diagram of an interpolation process according to some implementations. The interpolation process can be performed by the control system 116 of FIG. 1, or by some other control system.

The interpolation process receives (at 402) translational data (e.g., horizontal translational data) acquired by at least two seismic sensors 112 (FIG. 1) in a pattern of seismic sensors. Additionally, the interpolation process receives (at 404) gradient sensor data acquired by at least one gradient sensor. The received gradient sensor data can include divergence data acquired by a divergence sensor (208 in FIG. 2) and/or rotation data acquired by a rotational sensor (e.g., 204). In another example, as discussed above, gradient data can be derived from X and Y translational data measured by closely-spaced apart translational seismic sensors.

The interpolation process next computes (at 406) an interpolated translational data (e.g., interpolated horizontal translational data in the X, Y, or other horizontal direction) at a position between respective positions of the at least two seismic sensors, where computing the interpolated data is based on the gradient sensor data (including the divergence data and/or the rotation data, for example) and based on the translational data of the at least two seismic sensors.

Figure 5A:
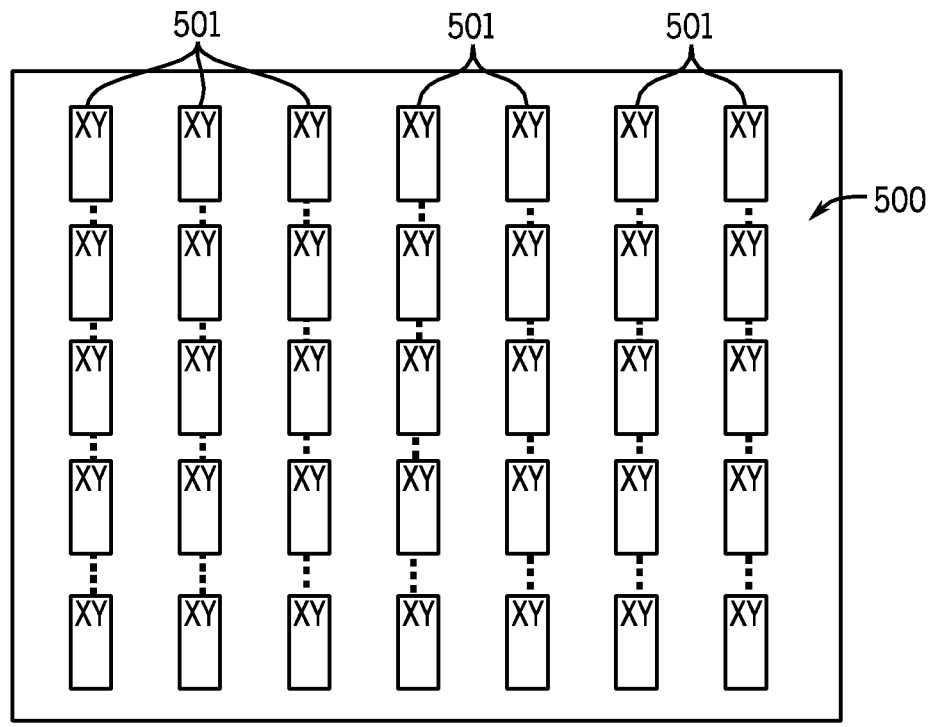
FIGS. 5A, 5B, and 6 illustrate example arrays of sensor assemblies according to some implementations.
Figure 5B:
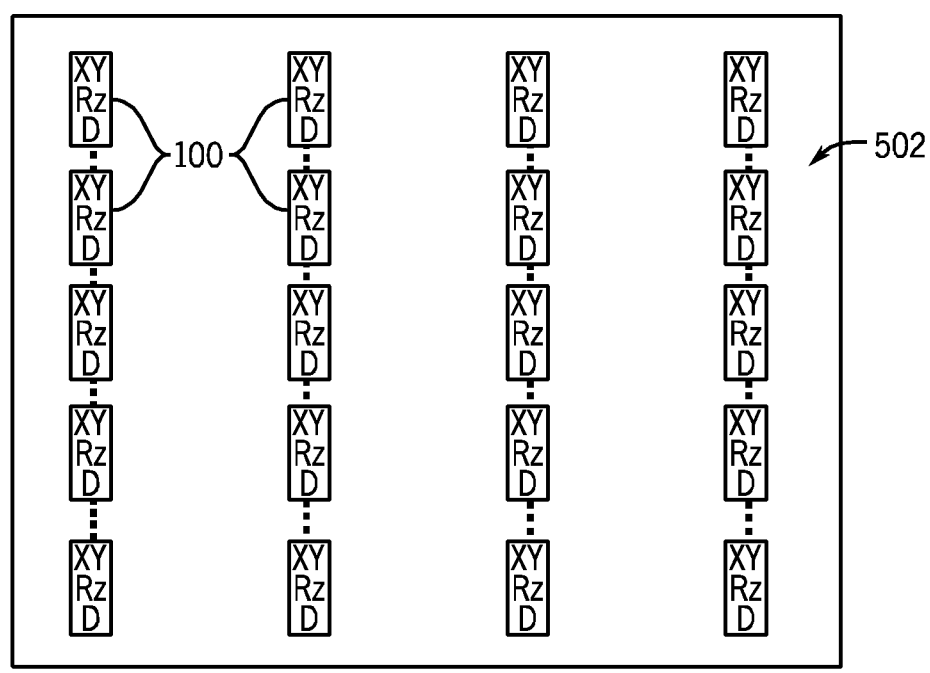

The following provides further details regarding how the interpolation can be performed, according to some examples. FIGS. 5A and 5B depict two different 2D arrays of seismic sensor assemblies. FIG. 5A shows a relatively dense array 500 of seismic sensor assemblies 501 in the X and Y directions. It is assumed that the seismic sensor assemblies 501 used in the array 500 are without the gradient sensors used according to some embodiments. The "X" and "Y" element in each sensor assembly 501 shown in FIG. 5A represents a seismic sensor element to measure translational data in the X direction and a seismic sensing element to measure translational data in the Y direction, respectively.

FIG. 5B shows a sparser array 502 of seismic sensor assemblies 100. Each seismic sensor assembly 100 includes a rotational sensor to measure rotation data (e.g., $R_Z$) and/or a divergence sensor to measure divergence data ($U_D$), as discussed above. Also, each sensor assembly 100 also includes seismic sensing elements to measure translational data in the X direction and Y direction (as indicated by the "X" and "Y" elements in each seismic sensor assembly 100).

In the array 502 of FIG. 5B, a smaller density of sensor assemblies 100 can be deployed in the Y direction as compared to the array 500 of FIG. 5A. To make up for the missing sensor assemblies in the Y direction (as compared to the array 500), an interpolation process according to some embodiments can be used to produce interpolated translational data at points corresponding to the missing sensor assemblies.

Taking into account the free surface effect (including reflection and conversion at an interface, such as a land surface or seafloor, at which the seismic sensors are located), the divergence data $U_D$ and the vertical rotation data $R_Z$ (about the vertical axis) are functions of the spatial derivatives of the $U_X$ inline and $U_Y$ crossline horizontal geophone data, as specified below:

$$U_D = \frac{\partial U_X}{\partial X} + \frac{\partial U_Y}{\partial Y}, \quad \text{(Eq. 1)}$$

$$R_Z = \frac{\partial U_X}{\partial Y} + \frac{\partial U_Y}{\partial X}. \quad \text{(Eq. 2)}$$

The term $\partial U_X/\partial X$ represents the inline spatial derivative of the inline seismic data, the term $\partial U_Y/\partial X$ represents the inline spatial derivative of the crossline seismic data, the term $\partial U_Y/\partial Y$ represents the crossline spatial derivative of the crossline seismic data and the term $\partial U_X/\partial Y$ represents the crossline spatial derivative of the inline seismic data.

Note that in Eqs. 1 and 2, it is assumed that the gradient sensors and the seismic sensors are calibrated (i.e., differences in impulse responses and coupling with the ground have been compensated for).

Also, it is assumed that the seismic data is densely sampled with a spacing of dX in the X direction such that the data is not aliased in this direction. In some implementations, this means that dX is shorter than half the shortest wavelength of the wavefield interest (data acquired with such dX spacing is referred to as Nyquist sampling). In such case, the $\partial U_i/\partial X$ (i=x, Y) terms can be accurately estimated through differentiation in the space domain, for example. As another example, the $\partial U_i/\partial X$ term can be estimated through multiplication with the wavenumber in the frequency-wavenumber domain (as set forth below):

$$\frac{\partial U_X(f,k)}{\partial X} = -ik U_X(f,k), \quad \text{(Eq. 3)}$$

where k represents the wavenumber, and f represents frequency. A similar expression can be used for calculation of $\partial U_Y/\partial X$. Using the estimates for the horizontal inline derivatives ($\partial U_X/\partial X$ and $\partial U_Y/\partial Y$) estimates for the crossline derivatives $\partial U_i/\partial Y$ (i=X, Y) can be obtained as follows:

$$\frac{\partial U_Y}{\partial Y} = U_D - \frac{\partial U_X}{\partial X}, \quad \text{(Eq. 4)}$$

$$\frac{\partial U_X}{\partial Y} = R_Z + \frac{\partial U_Y}{\partial X}. \quad \text{(Eq. 5)}$$

The crossline gradient in Eq 4 can also directly be obtained by differencing the pair of crossline oriented geophones in divergence sensor shown in FIG. 2B. The crossline gradient in Eq 5 can directly be obtained by differencing the two inline oriented geophones of the rotation sensor shown in FIG. 2A.

As set forth in Eqs. 4 and 5, by combining gradient sensor data ($U_D$ and $R_Z$) and translational data (the $\partial U_i/\partial X$ terms), the crossline spatial gradient of the horizontal seismic data (the $\partial U_Y/\partial Y$ and $\partial U_X/\partial Y$ terms) can be determined. This allows the use of the multi-channel sampling theorem for the spatial interpolation of the horizontal translational data. The multi-channel theorem states that a function and its derivative can be interpolated when the acquired data is measured at least once a wavelength of a wavefield of interest.

The recorded translational data $U_X(X, Y, r)$, where r represents a depth along the Z axis, and its crossline spatial derivative $\partial U_X(X, Y, r)/\partial Y$ are sampled uniformly at the positions $Y=Y_m$ (m=1, 2, 3 . . . ). An interpolated inline horizontal translational data, $U_X(X, Y, r)$, may be reconstructed at any Y position (that does not correspond to a position of a seismic sensor assembly in the Y direction) using the expression given below:

$$U_X(X, Y, r) = \sum_{m=-\infty}^{\infty} \left\{ U_X(X, Y_m, r) + (Y - Y_m) \frac{\partial U_X(X, Y_r, r)}{\partial Y} \right\} \left[ \mathrm{sinc}\left(\frac{Y}{\Delta Y} - m\right) \right]^2 (r \in R).$$

Similarly an interpolated crossline horizontal translational data, $U_Y(X, Y, r)$, may be reconstructed at any Y position using the following expression:

$$U_Y(X, Y, r) = \sum_{m=-\infty}^{\infty} \left\{ U_Y(X, Y_m, t) + (Y - Y_m) \frac{\partial U_Y(X, Y_k, r)}{\partial Y} \right\} \left[ \mathrm{sinc}\left(\frac{Y}{\Delta Y} - m\right) \right]^2 (r \in R).$$

In the foregoing expressions, $\Delta Y$ is the crossline spatial sampling in the Y direction, such as along the Y direction in FIG. 5B. Thus, while an arrangement to provide unaliased recordings often employs two senior assemblies per wavelength to allow unaliased sampling of a wavefield of interest, the estimated crossline derivatives (Eqs. 4 and 5) discussed above enable the interpolation of the horizontal translational data at any point (in the crossline direction Y) between two sensor assemblies up to a wavelength apart. As a result, less dense arrays in the Y direction (as shown in FIG. 5B, for example) can be employed, such that less than two sensor assemblies per wavelength have to be deployed in the Y direction. Although reference has been made to interpolating along the Y direction, note that interpolation can be made in a different direction (e.g., X direction) in another example. Arrangements employing interpolation techniques according to some implementations may employ up to two times fewer seismic sensor assemblies than with other example arrangements while maintaining the same data quality. This can potentially lead to a reduction in field deployment of seismic sensor assemblies.

Figure 6:
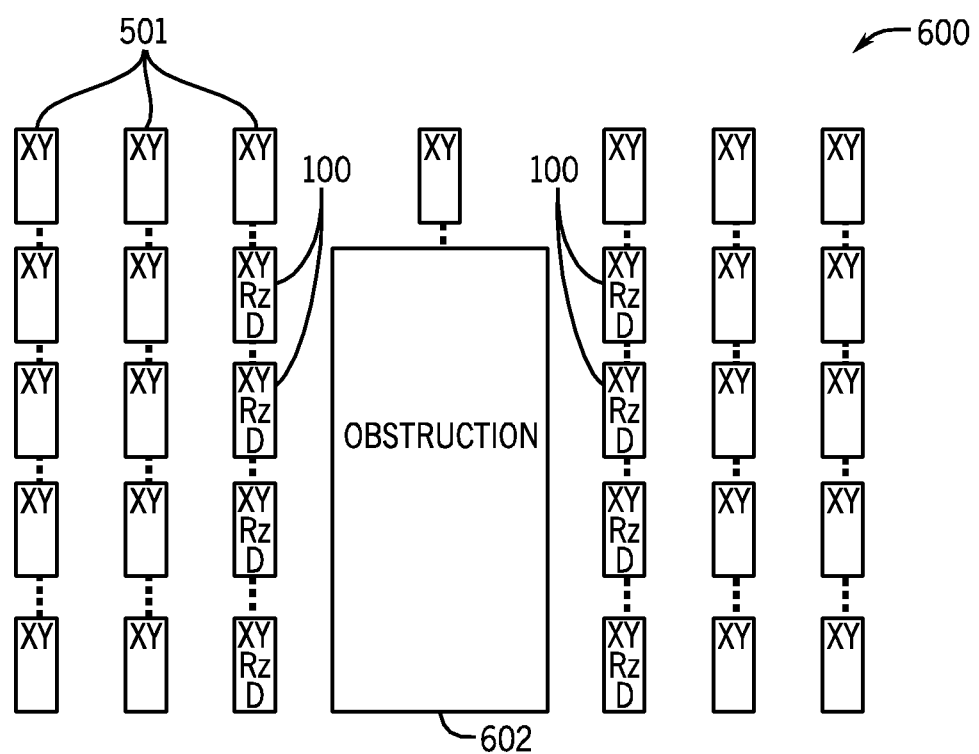

Interpolation techniques can also be useful in areas with obstructions as illustrated in FIG. 6. Here, an array 600 of seismic sensor assemblies 100 (those sensor assemblies containing "X," "Y," "Rz" and/or "D" sensors) are placed around an obstruction 602 allowing for reconstruction of the wavefield inside the area of the obstruction 602 using techniques discussed above. Note that the array 600 also includes seismic sensor assemblies 501 (those sensor assemblies containing "X" and "Y" sensors but no gradient sensors) at positions that are not adjacent to the obstruction 602.

Figure 7:
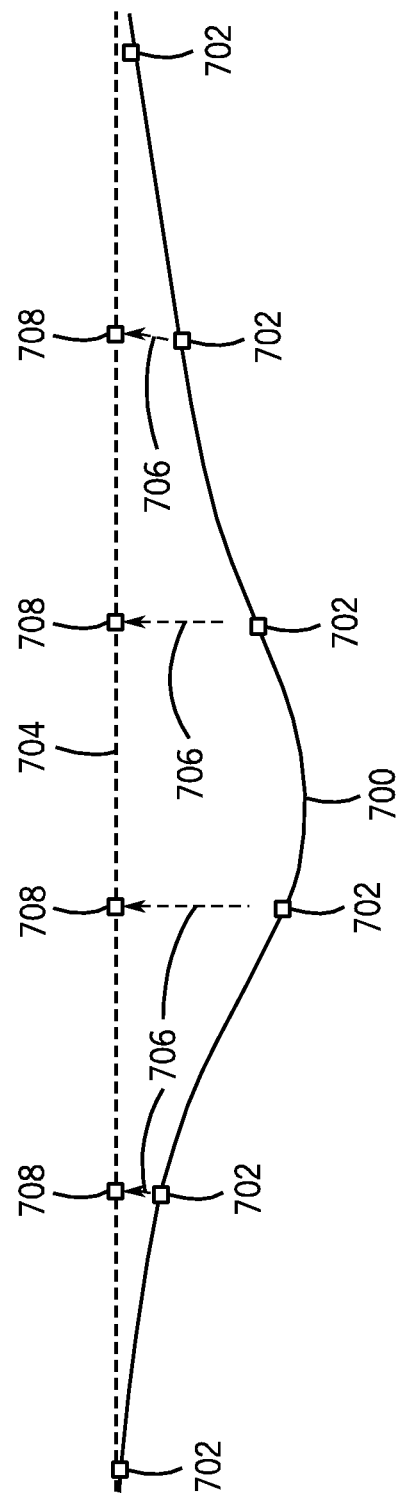
FIG. 7 illustrates an example of extrapolating seismic data, in accordance with some implementations.

In different implementations, instead of performing interpolation as described above, extrapolation can be performed instead. Extrapolation refers to projecting data from a first position to a second position. For example, a 2D non-linear seismic array (represented by curve 700 in FIG. 7) can have a number of sensor assemblies 702 that are not exactly in the in-line direction, for example. This can occur due to the sensor assemblies 702 following a curved road, being routed around obstructions, and so forth. Each sensor assembly 702 can include horizontal translational sensors and a gradient sensor, for example. The gradient data from the gradient sensor can be used to extrapolate the horizontal translational data (measured by the translational sensors), to regularize the sensor assembly positions. Extrapolated data (projected onto a straight line 704 in FIG. 7) can be easier to process.

The extrapolated wavefield(s), $U_X(X, Y+d)$ and $U_Y(X, Y+d)$, can be calculated according to the following:

$$U_X(X, Y+d) = U_X(X, Y) + d \cdot \frac{\partial U_X(X, Y)}{\partial Y},$$

$$U_Y(X, Y+d) = U_Y(X, Y) + d \cdot \frac{\partial U_Y(X, Y)}{\partial Y},$$

where d is the extrapolation distance (arrows 706 in FIG. 7) from the position of the sensor assembly 702 to the corresponding extrapolated position 708.

More generally, horizontal translational data at a location (where there is no seismic sensor assembly) can be estimated (interpolated or extrapolated) based on gradient sensor data.

Modules (e.g., 120 in FIG. 1) for performing tasks discussed above (including the process of FIG. 4) are loaded for execution on a processor or processors (such as 122 in FIG. 1). A processor can include a microprocessor, microcontroller, processor module or subsystem, programmable integrated circuit, programmable gate array, or another control or computing device.

Data and instructions are stored in respective storage devices, which are implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without at least some of these details. Other implementations may include modifications and variations from the details discussed above. It is intended that the appended claims cover such modifications and variations.

What is claimed is:

1. A method comprising:
    deploying a survey arrangement comprising at least one gradient sensor and an array of a first density of seismic sensors;
    receiving translational data acquired by the seismic sensors of the array;
    receiving gradient sensor data acquired by the at least one gradient sensor, wherein receiving the gradient sensor data comprises receiving divergence data acquired by a divergence sensor; and
    computing, by a computer, estimated horizontal translational data at a given position away from positions of the seismic sensors of the array, the computing being based on the gradient sensor data and the translational data, the estimated horizontal translational data at the given position corresponding to horizontal translational data of a non-existent seismic sensor, the estimated horizontal translational data providing for denser sampling of measurement data than available with the array of the first density of seismic sensors, wherein computing the estimated horizontal translational data comprises one of interpolating the horizontal translational data and extrapolating the horizontal translational data, and wherein the estimated horizontal translational data is at the given position where no seismic sensor is present; and
    identifying, by the computer using the estimated horizontal translational data and the translational data acquired by the seismic sensors of the array, a subterranean element in a subterranean structure.

2. The method of claim 1, wherein receiving the translational data comprises receiving the translational data that is unaliased along a first direction and aliased along a second, different direction.

3. The method of claim 2, wherein the given position away from the positions of the seismic sensors of the array is spaced apart from at least one position of at least one seismic sensor of the array along the second direction, and wherein the received translational data is along the first direction, and the estimated horizontal translational data is along the first direction.

4. The method of claim 3, wherein the first direction is a first horizontal direction, and the second direction is a second horizontal direction that is generally orthogonal to the first horizontal direction.

5. The method of claim 1, wherein receiving the gradient sensor data comprises:
    receiving rotation data from a rotational sensor, or
    receiving rotation data derived from translational data acquired by respective seismic sensors spaced apart by less than a predefined distance.

6. The method of claim 1, wherein receiving the divergence data acquired by the divergence sensor comprises receiving the divergence data from the divergence sensor including a pressure sensor and a container containing a material in which the pressure sensor is immersed.

7. The method of claim 1, wherein receiving the gradient sensor data comprises receiving data relating to a rate of rotation about a vertical axis.

8. The method of claim 1, wherein the estimated horizontal translational data is computed at the given position that corresponds to an obstruction in a field of deployment that prevents deployment of a seismic sensor at the given position.

9. The method of claim 1, further comprising: providing gradient sensors along a first direction separated by a first offset; and providing gradient sensors along a second direction separated by a second offset that is greater than the first offset, wherein computing the estimated translational data is along the second direction and is based on gradient sensor data from at least one of the gradient sensors.

10. A system comprising:
an arrangement comprising at least one gradient sensor and an array of a first density of seismic sensors; and
at least one processor to:
receive translational data at respective positions acquired by the array of the first density of seismic sensors;
receive gradient sensor data including divergence data and rotation data from the at last one gradient sensor, wherein the divergence data is acquired by a divergence sensor; and
combine the translational data and the gradient sensor data to estimate translational data at a given position between the respective positions of the seismic sensors in the array, wherein no seismic sensor exists at the given position, the estimated translational data at the given position corresponding to translational data of a non-existent seismic sensor, the estimated translational data providing for denser sampling of measurement data than available with the array of the first density seismic sensors, wherein estimating the translational data comprises one of interpolating the translational data and extrapolating the translational data, and wherein the estimated translational data is at the given position where no seismic sensor is present; and
identify, using the estimated horizontal translational data and the translational data acquired by the array of seismic sensors, a subterranean element in a subterranean structure.

11. The system of claim 10, wherein the array of seismic sensors have relative spacings to provide unaliased acquisition of the translational data along a first direction, and an aliased acquisition of the translational data along a second, different direction, wherein the estimated translational data is at the position along the second direction.

12. The system of claim 10, wherein the translational data acquired by the array of the first density of seismic sensors includes translational data acquired by seismic sensors spaced apart by greater than a distance equal to half the wavelength of a wavefield of interest, wherein the estimated translational data includes interpolated translational data at a position between two seismic sensors of the array.

13. The system of claim 10, wherein the received translational data is along a first direction, and the given position is offset from positions of two of the seismic sensors in the arrangement along a second direction generally orthogonal to the first direction.

14. An article comprising at least one non-transitory machine-readable storage medium storing instructions that upon execution cause a system to:
receive translational data at a first position acquired by at least one seismic sensor at the first position, the at least one seismic sensor part of an array of seismic sensors having a first density of seismic sensors;
receive gradient sensor data acquired by at least one gradient sensor, wherein receiving the gradient sensor data comprises receiving divergence data acquired by a divergence sensor;
compute an estimated horizontal translational data at a second position away from at least the first position of the at least one seismic sensor, the computing being based on the gradient sensor data and the translational data at the first position, the estimated horizontal translational data at the first position corresponding to horizontal translational data of a non-existent seismic sensor, the estimated horizontal translational data providing for denser sampling of measurement data than available with the array of seismic sensors, wherein computing the estimated horizontal translational data comprises one of interpolating the horizontal translational data and extrapolating the horizontal translational data, and wherein the estimated horizontal translational data is at the given position where no seismic sensor is present; and
identify, using the estimated horizontal translational data and the translational data acquired by the at least one seismic sensor, a subterranean element in a subterranean structure.

15. The article of claim 14, wherein the gradient sensor data includes rotation data.

16. The article of claim 14, wherein receiving the translational data comprises receiving the translational data that is unaliased along a first direction and aliased along a second, different direction, wherein the second position is spaced apart from the first position along the second direction, and wherein the received translational data is along the first direction, and the estimated translational data is along the first direction.

17. The article of claim 16, wherein the first direction is a first horizontal direction, and the second direction is a second horizontal direction generally orthogonal to the first horizontal direction.

* * * * *